(12) United States Patent
Lindahl

(10) Patent No.: US 10,767,771 B2
(45) Date of Patent: Sep. 8, 2020

(54) SLIDE SLEEVE VALVE HAVING INTEGRAL LEAK PREVENTION

(71) Applicant: The Boeing Company, Chicago, IL (US)

(72) Inventor: Gary M. Lindahl, Newcastle, WA (US)

(73) Assignee: The Boeing Company, Chicago, IL (US)

( * ) Notice: Subject to any disclaimer, the term of this patent is extended or adjusted under 35 U.S.C. 154(b) by 209 days.

(21) Appl. No.: 15/657,596

(22) Filed: Jul. 24, 2017

(65) Prior Publication Data

US 2019/0024807 A1 Jan. 24, 2019

(51) Int. Cl.
*F16K 11/07* (2006.01)
*F16K 27/04* (2006.01)
(Continued)

(52) U.S. Cl.
CPC .......... *F16K 11/0712* (2013.01); *F16K 3/246* (2013.01); *F16K 5/0485* (2013.01);
(Continued)

(58) Field of Classification Search
CPC . F16K 1/42; F16K 1/425; F16K 3/246; F16K 11/02; F16K 11/06; F16K 11/065; F16K 11/07; F16K 11/0712; F16K 11/0716; F16K 11/022; F16K 11/025; F16K 27/04; F16K 27/041; F16K 27/042; F16K 31/122; F16K 31/1221; F16K 31/1223; F16K 31/1226; F16K 31/38; F16K 31/383; Y10T 137/0502; Y10T 137/6007; Y10T 137/86493; Y10T 137/86574; Y10T 137/8667; Y10T 137/86678;
(Continued)

(56) References Cited

U.S. PATENT DOCUMENTS 1,503,683 A * 8/1924 Darling ................. F01D 17/145
137/625.48
2,952,275 A * 9/1960 Mock ...................... F15B 13/04
137/625.42
(Continued)

OTHER PUBLICATIONS

Hydraulic accumulator; Wikipedia; Apr. 7, 2017.
(Continued)

*Primary Examiner* — Hailey K. Do
(74) *Attorney, Agent, or Firm* — Duft & Bornsen, PC

(57) ABSTRACT

Systems and methods are provided for enhanced valves. One embodiment is a hydraulic valve that includes a housing that defines a first port, a second port, and a third port for a hydraulic fluid, and a sleeve disposed within the housing that defines openings in fluid communication with the second port and the third port. The valve also includes a slide comprising a head and a shaft. The shaft is disposed within the sleeve and the slide is movable in a lengthwise direction from a closed position to an open position. The head includes a circumferential lip that extends perpendicular to the lengthwise direction, and that abuts the sleeve when the slide is in the closed position to prevent flow of the hydraulic fluid from the first port. The shaft provides a flow path between the second port and the third port when the slide is closed.

20 Claims, 6 Drawing Sheets

(51) Int. Cl.
  *F16K 3/24* (2006.01)
  *F16K 5/04* (2006.01)
  *F16K 31/122* (2006.01)
  *F16K 11/02* (2006.01)
(52) U.S. Cl.
  CPC ............ *F16K 11/07* (2013.01); *F16K 27/041* (2013.01); *F16K 31/122* (2013.01); *F16K 11/02* (2013.01)
(58) Field of Classification Search
  CPC ....... Y10T 137/86694; Y10T 137/8671; Y10T 137/86879; Y10T 137/86887; Y10T 137/87169
  See application file for complete search history.

(56) References Cited

U.S. PATENT DOCUMENTS

| | | | | |
|---|---|---|---|---|
| 3,556,155 | A * | 1/1971 | McWilliams | B62D 5/087 137/625.69 |
| 4,103,711 | A * | 8/1978 | Arvin | F16K 11/04 137/625.26 |
| 6,375,154 | B1 * | 4/2002 | Kussel | F15B 13/01 137/625.26 |
| 2007/0113906 | A1 * | 5/2007 | Sturman | F15B 13/0402 137/625.65 |
| 2009/0250645 | A1 * | 10/2009 | Imamura | F16K 31/0655 251/129.15 |
| 2012/0193565 | A1 * | 8/2012 | Rowe | F16K 1/36 251/359 |
| 2015/0096291 | A1 * | 4/2015 | Takeuchi | E02F 9/2203 60/460 |
| 2017/0204983 | A1 * | 7/2017 | Sidders | F16K 11/048 |
| 2018/0163888 | A1 * | 6/2018 | Ishikawa | F16K 3/24 |

OTHER PUBLICATIONS

Hydraulics & Pneumatics; Accumulators; A Staff Report Jan. 1, 2012.
Sleeve valve; Wikipedia; Jun. 6, 2017.

* cited by examiner

CLOSED

FIG. 2 OPEN

SLIDE SLEEVE VALVE HAVING INTEGRAL LEAK PREVENTION

FIELD

The disclosure relates to the field of mechanics, and in particular, to slide sleeve valves for hydraulic systems.

BACKGROUND

Slide sleeve valves are utilized for a variety of purposes in hydraulic systems. For example, slide sleeve valves may be utilized to coordinate the actions of an accumulator that utilizes hydraulic fluid to store energy for later usage. An aircraft may utilize an accumulator to store potential energy for its hydraulic systems in order to ensure that the hydraulic systems may still be operated in the event of a loss of power.

A variety of designs exist for slide sleeve valves. However, all designs have leakage rates that drive inefficiencies in the system. This is especially true for valves utilized in aircraft, where weight reduction is also highly valued. Designers of slide sleeve valves therefore continue to seek out designs that reduce leakage, are efficient, lightweight, and cost-effective.

Therefore, it would be desirable to have a method and apparatus that take into account at least some of the issues discussed above, as well as other possible issues.

SUMMARY

Embodiments described herein provide for a slide sleeve valve having a slide that utilizes a circumferential lip to enhance sealing strength between the slide and a sleeve in which a majority of the slide is disposed. For example, the circumferential lip may extend outside of the sleeve, and may seal against a corresponding annular protrusion at the sleeve while the slide is in a closed position to prevent flow of a hydraulic fluid. Further slides described herein may include flow grooves that enable flow of the hydraulic fluid to be smoothly increased as the slide transitions from the closed position to an open position.

One embodiment is an apparatus that includes a hydraulic valve. The hydraulic valve includes a housing that defines a first port, a second port, and a third port for a hydraulic fluid, and a sleeve disposed within the housing that defines openings in fluid communication with the second port and the third port. The valve also includes a slide comprising a head at a first end and a shaft at a second end. The shaft is disposed within the sleeve and the slide is movable in a lengthwise direction from a closed position to an open position. The head includes a circumferential lip that extends perpendicular to the lengthwise direction, and that abuts the sleeve when the slide is in the closed position such that flow of the hydraulic fluid from the first port is prevented. The shaft provides a flow path between the second port and the third port when the slide is in the closed position.

A further embodiment is a method for operating a slide of a hydraulic valve, the slide comprising a head at a first end and a shaft at a second end, the slide disposed within a sleeve and movable in a lengthwise direction from a closed position to an open position. The method includes displacing the slide from the open position to the closed position such that a circumferential lip of the head abuts the sleeve and prevents flow of a hydraulic fluid from a first port into the sleeve, wherein the circumferential lip extends perpendicular to the lengthwise direction. The method further includes maintaining the slide in the closed position in response to pressure from the hydraulic fluid applied to the circumferential lip from outside of the sleeve, and displacing the slide from the closed position to the open position, thereby enabling the hydraulic fluid to flow across the head towards through the sleeve to a second port.

A further embodiment is an apparatus. The apparatus includes a slide for a hydraulic valve. The slide includes a head disposed at a left end of the slide. The head includes a protrusion forming a leftmost portion of the head, a circumferential lip disposed rightward of the protrusion, and circumferentially disposed flow grooves which are located rightward of the circumferential lip and extend rightward. The slide also includes a shaft disposed rightward of the head. The shaft includes a shaft body having a width less than a width of a sleeve in which the slide is disposed, and a shaft base having a width corresponding with the width of the sleeve.

Other exemplary embodiments (e.g., methods) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

DESCRIPTION

The figures and the following description illustrate specific exemplary embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1:
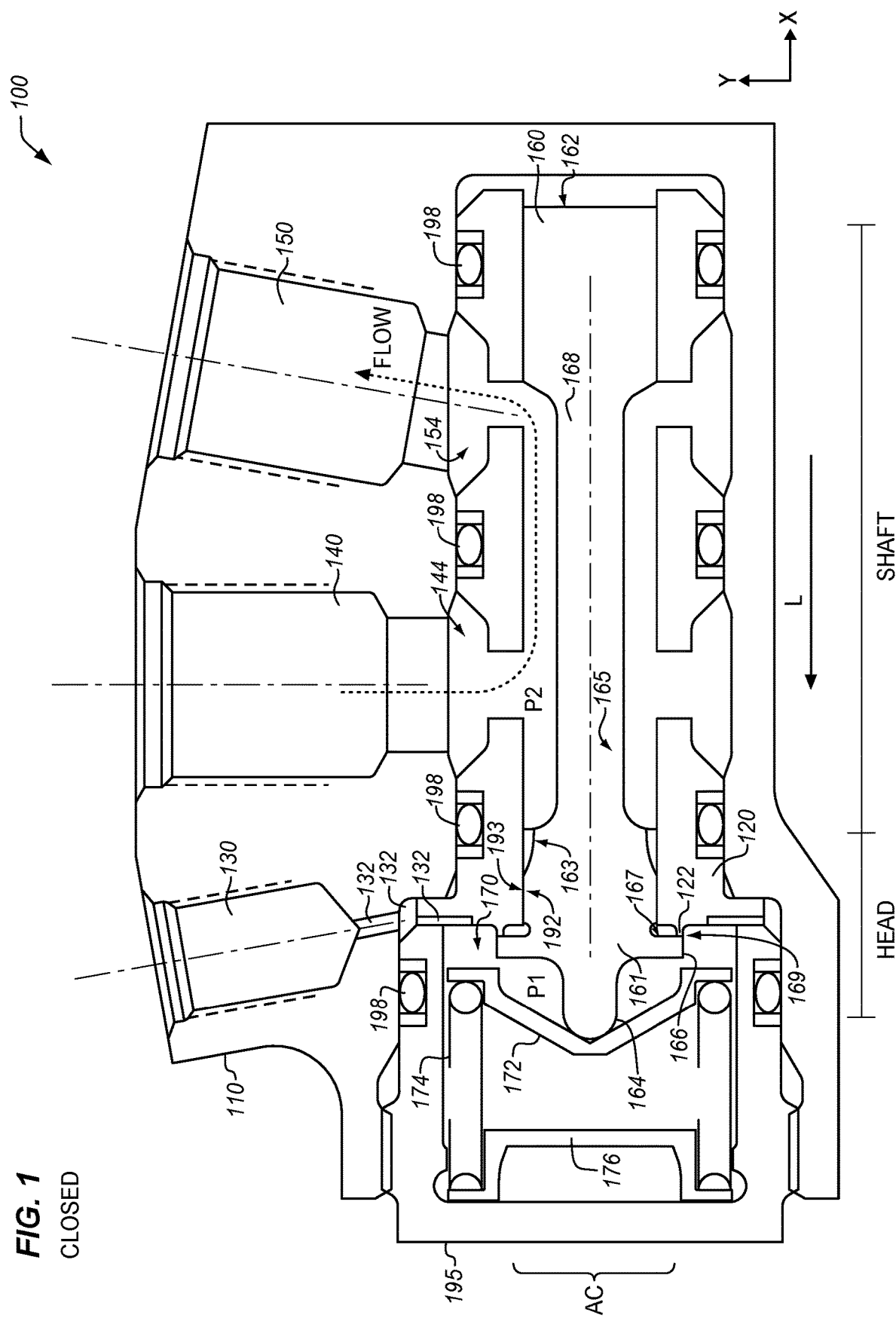
FIG. 1 is a diagram of a slide sleeve valve assembly in a closed position in an exemplary embodiment.

FIG. 1 is a diagram of a closed slide sleeve valve assembly 100 in an exemplary embodiment. Assembly 100 comprises any system, device, or component operable to selectively control flow of a hydraulic fluid by operating as a hydraulic valve. In this embodiment, assembly 100 comprises housing 110, sleeve 120, end cap 195, and slide 160. Housing 110 defines multiple ports. Sleeve 120 defines multiple openings via which hydraulic fluid may travel to enter or exit the ports. These openings are therefore in fluid communication with the ports. Slide 160 moves from an open position to a closed position to selectively control which ports of housing 110 are in fluid communication with each other.

In this embodiment, housing 110 defines first port 130, such as an inlet port via which hydraulic fluid enters assembly 100 at a supply pressure of 3,000 Pounds per Square Inch (PSI). Hydraulic fluid travels through first port 130, across passages 132, and into chamber 170. While slide 160 is in the closed position as shown, hydraulic fluid remains sealed within chamber 170 and hence remains external to sleeve 120. In this embodiment, seal 169 is formed by contact between inner surface 167 of circumferential lip 166 and annular protrusion 122 of sleeve 120. In one embodiment where annular protrusion 122 and inner surface 167 are both metals (e.g., aluminum, steel, etc.) that are placed into metal-to-metal contact, these components each have a roughness value (Ra) of less than five microinches in order to ensure that the resulting seal is tight.

Seal 169 is maintained by force holding slide 160 in the closed position. The force is primarily provided by hydraulic pressure P1 within chamber 170, which is distributed across cross-sectional area AC (e.g., a circular area having a diameter corresponding with the bracket labeled AC). This hydraulic pressure P1 generates force based on the difference between P1 within chamber 170 (e.g., 3,000 PSI), and P2 (e.g., a few hundred PSI) at the other end of seal 169. Force maintaining seal 169 is also provided by spring carrier 172, which contacts protrusion 164 of head 161 of slide 160 at a left end of slide 160. Spring carrier 172 is driven towards protrusion 164 in response to force from springs 174. A stop 176 is also illustrated, which ensures that slide 160 does not travel further than a predefined distance to the left when slide 160 is moved to the open position.

Housing 110 further defines second port 140, such as an outlet port which will receive hydraulic fluid that will perform work when slide 160 is moved to the open position. For example, flow of hydraulic fluid into second port 140 may be utilized to drive a cylinder of an emergency accumulator, to drive an actuator, etc. Housing 110 also defines third port 150 such as a return port that enables hydraulic fluid to return to a reservoir for re-use. While slide 160 is in the closed position as shown in FIG. 1, second port 140 and third port 150 are placed into fluid communication via opening 144 and opening 154. Thus, hydraulic fluid flows from second port 140 to third port 150 for re-use.

Slide 160 also includes flow grooves 163 at head 161. In this embodiment flow grooves 163 increase in depth along X (e.g., in a direction opposed to direction L). This enables flow grooves 163 to smoothly increase flow of hydraulic fluid from chamber 170 as slide 160 progressively opens valve assembly 100 by moving to the left. Flow grooves 163 are circumferentially distributed/disposed along head 161. However, portions of head 161 still remain in sliding contact with sleeve 120, such that surface 192 of head 161 slidably contacts surface 193 of sleeve 120. This configuration allows hydraulic fluid to travel through flow grooves 163 across head 161 when the slide is in the open position. It also allows surface 192 to operate as a guide which ensures that slide 160 is axially aligned with sleeve 120. Slide 160 further includes shaft 168 comprising shaft body 165, and shaft base 162. Shaft body 165 has a width less than that of sleeve 120 (i.e., less than that of the opening defined by sleeve 120 in which slide 160 slides). Shaft base 162 forms a sliding seal with sleeve 120, and has a diameter corresponding with that of sleeve 120. External pressure or force may be applied to base 162 to actuate the valve to an open position.

FIG. 1 further illustrates end cap 195, which may comprise a threaded end cap holding spring carrier 172 in place. Seals 198 (e.g., O-rings, gaskets) are also placed throughout slide sleeve valve assembly 100 to ensure that hydraulic fluid does not leak through the border between end cap 195 and housing 110, or through the border between sleeve 120 and housing 110.

Figure 2:
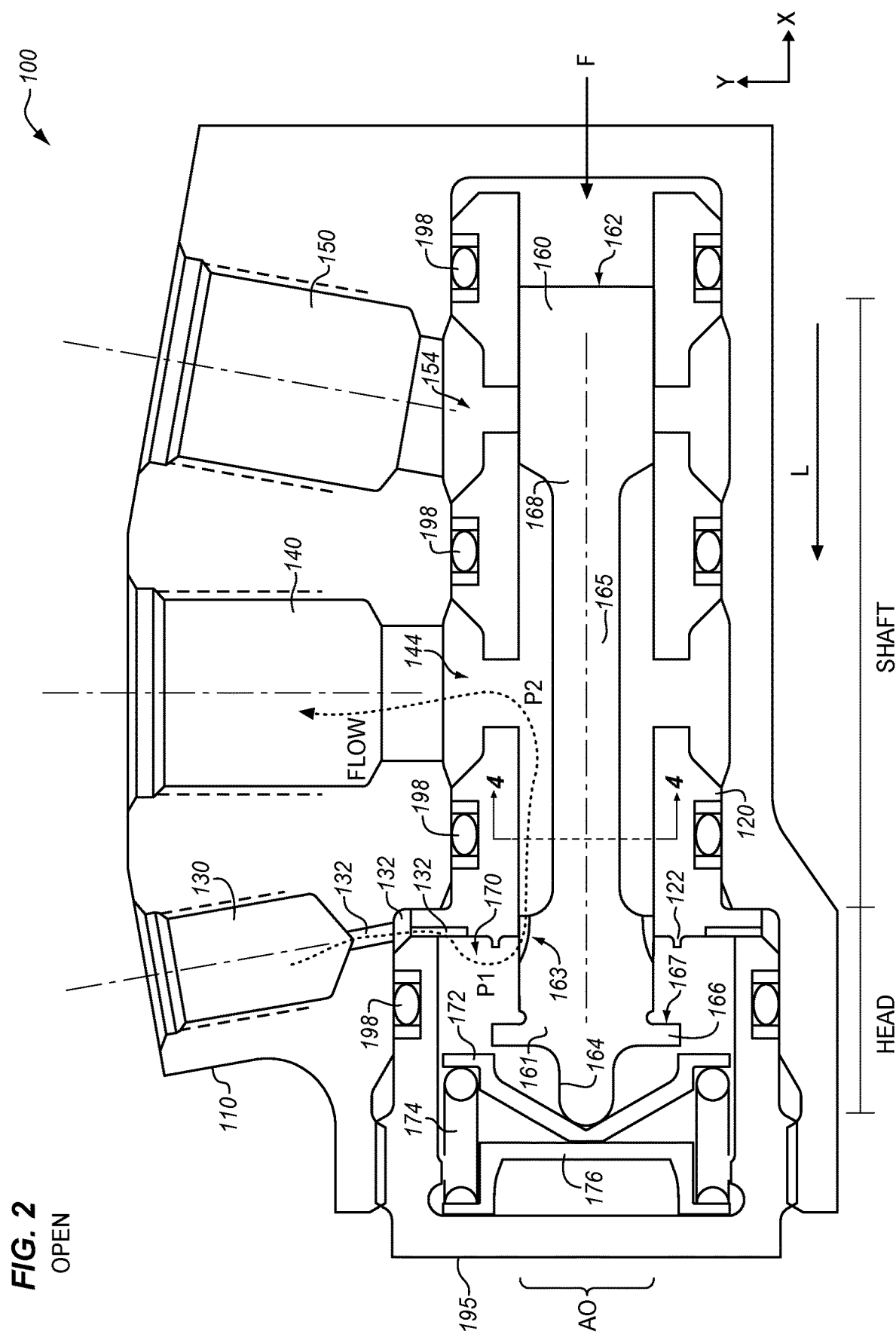
FIG. 2 is a diagram of a slide sleeve valve assembly in an open position in an exemplary embodiment.

FIG. 2 is a diagram of slide sleeve valve assembly 100 in an open position in an exemplary embodiment. In this configuration, a force F has been applied to slide 160, which has displaced slide 160 along a lengthwise direction L from the closed position to the open position. The force may be selectively applied in response to input from a control unit, such as a hardware processor implementing programmed instructions, or a dedicated piece of hardware. The displacement of slide 160 unseats circumferential lip 166, which opens a flow pathway for hydraulic fluid to travel from chamber 170 through flow grooves 163 and into second port 140. Hence, when slide 160 is in the open position, pressurized hydraulic fluid may perform work as desired by traveling through second port 140. The displacement of slide 160 also closes a flow pathway between third port 150 and second port 140 by blocking opening 154 with shaft base 162. This ensures that hydraulic fluid from first port 130 does not flow directly to third port 150 without performing work.

While slide 160 is in the open position, the force used to hold slide 160 open remains lower than the force used to initially unseat slide 160 from the closed position. This benefit arises from multiple contributing factors. First, because flow grooves 163 enable flow of the hydraulic fluid from chamber 170 to port 140, the difference between P1 and P2 is reduced. For example, P1 may remain constant (e.g., at 3,000 PSI), while P2 may rise (e.g., by 1,000-2,000 PSI, or even more). This results in less hydraulic pressure forcing slide 160 closed. Second, the area over which hydraulic pressure is applied is also reduced, because circumferential lip 166 is no longer being pressed into the closed position. This results in hydraulic pressure being applied across cross-sectional area AO (e.g., a circular area having a diameter corresponding with the bracket labeled AO), which is smaller than AC.

Figure 3:
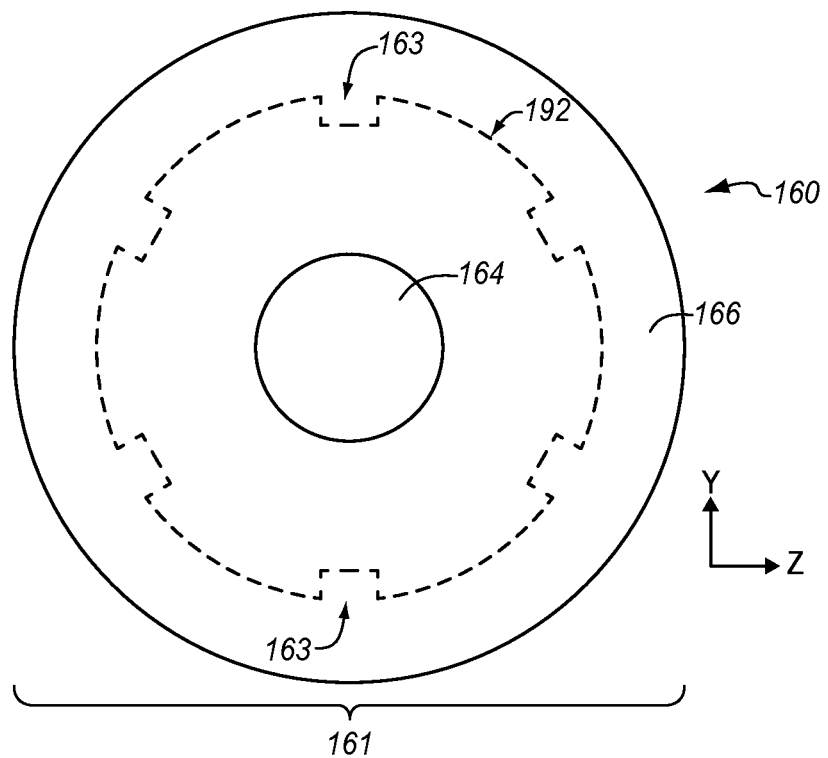
FIG. 3 is a head-on view of a head of a slide in an exemplary embodiment.
Figure 4:
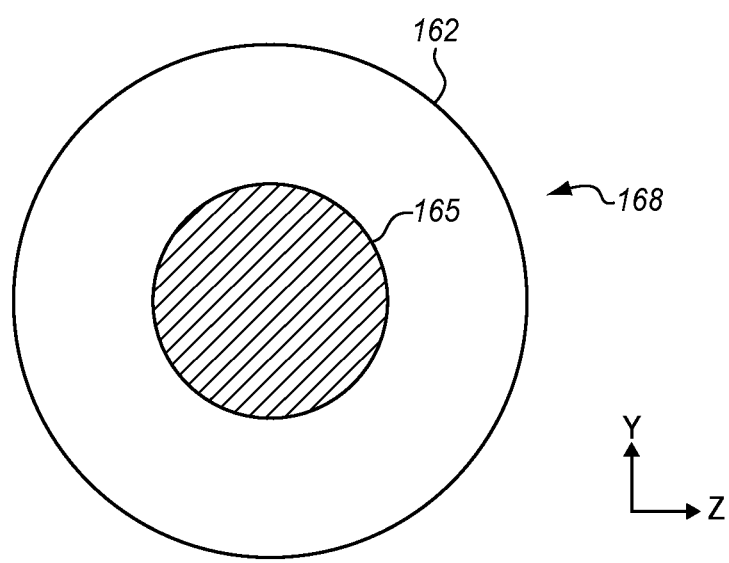
FIG. 4 is a cut-through view of a shaft of a slide in an exemplary embodiment.

FIG. 3 is a head-on view of head 161 of slide 160 in an exemplary embodiment. FIG. 3 illustrates protrusion 164 as well as lip 166. FIG. 3 also illustrates flow grooves 163, which in this embodiment are circumferentially spaced such that they are equally radially distributed across head 161 of slide 160. FIG. 4 is a cut-through view of shaft 168 of slide 160 in an exemplary embodiment. The view depicted in FIG. 4 corresponds with view arrows 4 of FIG. 2. FIG. 4 illustrates shaft body 165, as well as shaft base 162.

Illustrative details of the operation of assembly 100 will be discussed with regard to FIG. 5. Assume, for this embodiment, that slide 160 is presently in an open position, wherein hydraulic fluid is traveling from chamber 170 into second port 140 in order to perform work such as driving an actuator.

Figure 5:
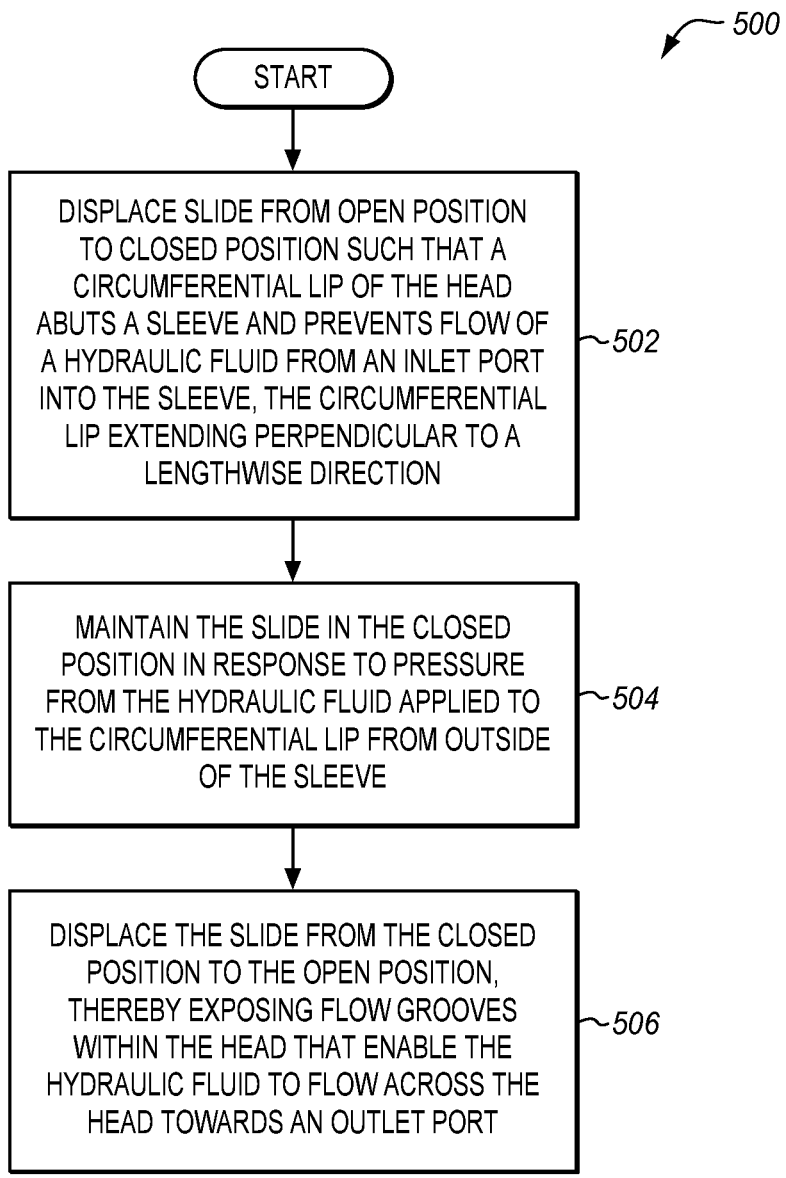
FIG. 5 is a flowchart illustrating a method for operating a slide sleeve valve in an exemplary embodiment.

FIG. 5 is a flowchart illustrating a method 500 for operating a slide sleeve valve in an exemplary embodiment. The steps of method 500 are described with reference to assembly 100 of FIG. 1, but those skilled in the art will appreciate that method 500 may be performed in other systems as desired. The steps of the flowcharts described herein are not all inclusive and may include other steps not shown. The steps described herein may also be performed in an alternative order.

To seal assembly 100 and prevent flow of hydraulic fluid, force F is removed. This results in hydraulic and spring force that displaces slide 160 from the open position to the closed position, which causes circumferential lip 166 of head 161 to abut protrusion 122 of sleeve 120 (step 502). In the closed position, a flow pathway between first port 130 and second port 140 remains sealed, which means that no new hydraulic fluid travels into second port 140. Instead, hydraulic fluid exits second port 140 and proceeds to third port 150 (as shown in FIG. 1). The hydraulic fluid may then return to a reservoir of hydraulic fluid. In this configuration hydraulic pressure from hydraulic fluid within chamber 170 is applied to circumferential lip 166 (as well as the rest of area AC as shown in FIG. 1). In response to this pressure, slide 160 is maintained in the closed position (step 504).

At some point in time, force F is applied. This action displaces slide 160 from the closed position to the open position, which exposes flow grooves 163 to chamber 170 (step 506). Flow grooves 163 enable the hydraulic fluid to flow across head 161 of slide 160 towards second port 140 in order to perform work (as shown in FIG. 2). Furthermore, shaft base 162 of slide 160 seals the flow pathway between second port 140 and third port 150. This may ensure that hydraulic fluid does not flow directly back to a reservoir without performing the desired work. After slide 160 has been move to the open position, force F may be reduced (e.g., from an unseating force to a lower amount of force) while maintaining slide 160 in the open position.

Method 500 provides a substantial advantage over prior methods, in that it utilizes an enhanced valve with a circumferential lip to enhance the amount of sealing pressure applied when a valve is closed. This helps to ensure that the slide remains seated and closed when desired. At the same time, this design ensures that the force used to maintain a slide in the open position may be less than the amount of force used to unseat the valve from the closed positon.

Figure 6:
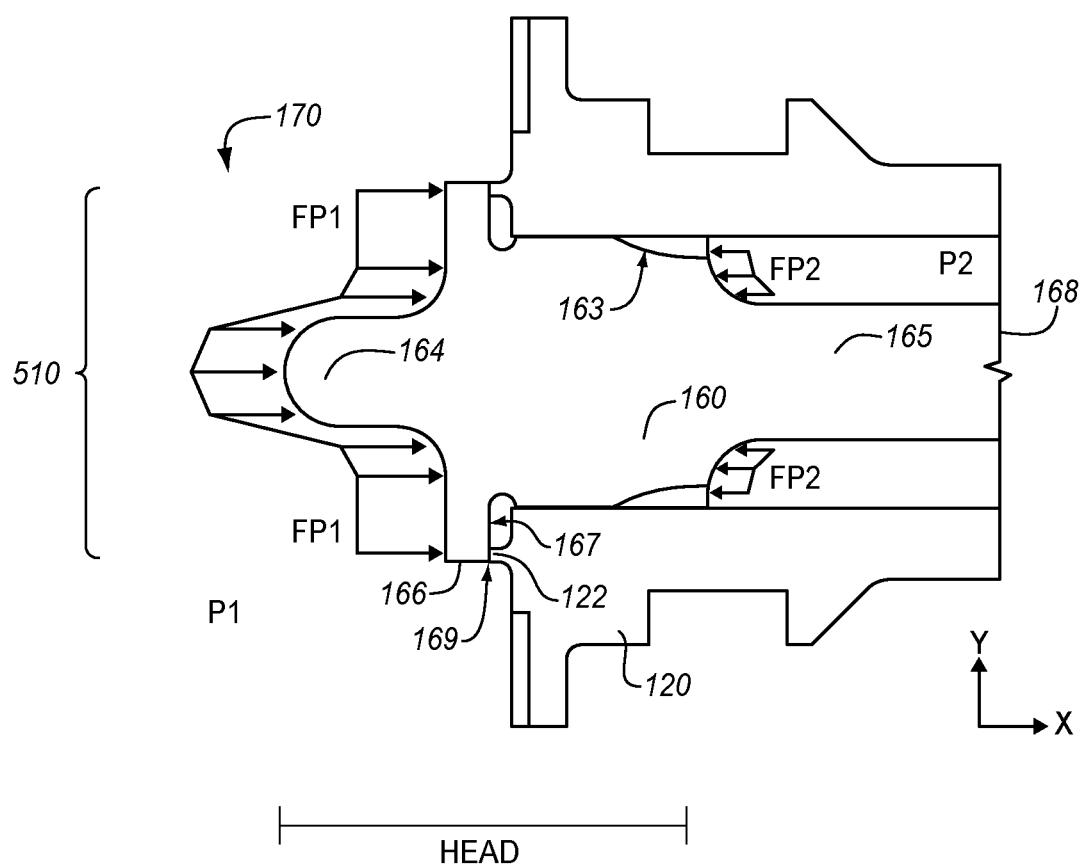
FIG. 6 is a diagram illustrating forces applied to a slide of a slide sleeve valve in a closed position in an exemplary embodiment.
Figure 7:
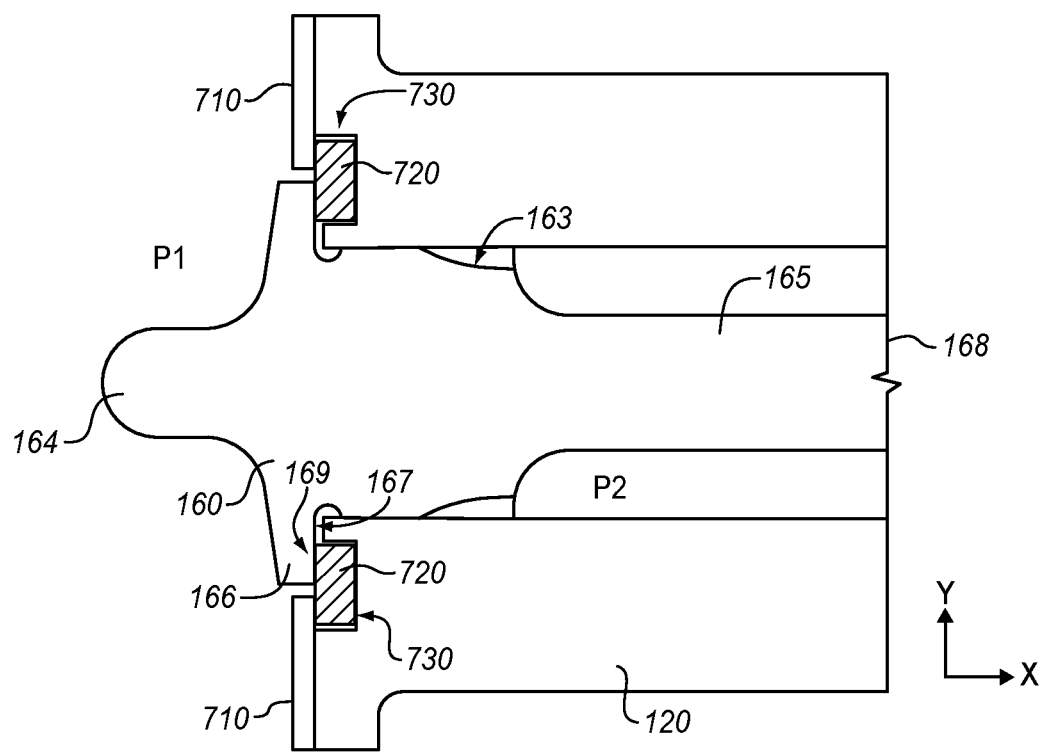
FIG. 7 is a diagram illustrating a slide sleeve valve that includes a gasket in an exemplary embodiment.

Further illustrative details of seal 169 formed between circumferential lip 166 and sleeve 120 are provided with respect to FIGS. 6-7. FIG. 6 illustrates an embodiment wherein seal 169 is formed by metal-to-metal contact between circumferential lip 166 and an annular protrusion 122, while FIG. 7 illustrates an embodiment wherein seal 169 is formed by contact between circumferential lip 166 and a gasket at sleeve 120.

FIG. 6 is a diagram illustrating forces applied to slide 160 of slide sleeve valve assembly 100 in a closed position in an exemplary embodiment. As shown in FIG. 6, seal 169 is formed by forces pressing slide 160 rightward along X into annular protrusion 122 of sleeve 120. In this embodiment, the cross-sectional area of annular protrusion 122 is very small compared to the cross-sectional area 510 of head 161. This results from annular protrusion 122 having a cross-sectional area equal to $\pi*(\text{Outer Radius})^2 - \pi*(\text{Inner Radius})^2$. In embodiments where the inner radius and outer radius of annular protrusion 122 are close to each other (e.g., within a tenth of an inch of each other), the resulting cross-sectional area of annular protrusion 122 is particularly small in comparison with that of head 161. Hence, the cross-sectional area of head 161 may be for example five times as large as that of annular protrusion 122, or even many more times as large. This increases contact stress at seal 169, which ensures that seal 169 is resistant to intrusion from a hydraulic fluid at a high pressure P1. Dimensions may be selected for the various components of slide sleeve valve assemble 100 such that stress at seal 169 remains substantial without causing annular protrusion 122 or lip 166 to yield.

FIG. 6 further illustrates FP1, which is a force distributed across the cross-sectional area of head 161, and is based on pressure P1 within chamber 170. A countervailing force FP2 applies force pushing slide 160 leftward. However, the cross-sectional area over which FP2 is applied, and the amount of pressure P2 driving FP2, is much smaller. Hence, FP1 overcomes FP2 and holds slide 160 seated in the closed position. Spring forces (not shown) may also be applied by spring carrier 172 of FIG. 1 in order to hold slide 160 in the closed position. However, FP1 substantially exceeds the spring forces (e.g., by a factor of ten) in many embodiments.

FIG. 7 is a diagram illustrating a slide sleeve valve that includes a gasket in an exemplary embodiment. In this embodiment, sleeve 120 includes an annular recess 730 into which an elastically deformable gasket 720 is placed. Gasket 720 elastically deforms in response to slide 160 being moved into the closed position, which beneficially increases surface contact between gasket 720 and inner surface 167 of circumferential lip 166. In this embodiment, a clamp 710 may be adhered to sleeve 120 (e.g., via bolts or other fasteners) in order to clamp gasket 720 in place within recess 730.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

What is claimed is:
1. An apparatus comprising:
a hydraulic valve comprising:
a housing that defines a first port, a second port, and a third port for a hydraulic fluid;

a sleeve disposed within the housing that defines openings in fluid communication with the second port and the third port; and a slide comprising a head at a first end and a shaft at a second end, the shaft is disposed within the sleeve and the slide is movable in a lengthwise direction from a closed position to an open position, the sleeve includes an annular protrusion on an end face of the sleeve that protrudes in the lengthwise direction, the head includes a circumferential lip having an inner surface extending perpendicularly to the lengthwise direction and facing the sleeve, wherein the inner surface abuts the annular protrusion of the sleeve to form a seal between the slide and the sleeve when the slide is in the closed position such that flow of the hydraulic fluid through the first port is stopped, and the shaft provides a flow path between the second port and the third port when the slide is in the closed position.

2. The apparatus of claim 1 wherein:
an area of the head is at least five times as large as an area of the annular protrusion.

3. The apparatus of claim 1 wherein:
the circumferential lip protrudes beyond the sleeve in the lengthwise direction when the slide is in the closed position and when the slide is in the open position.

4. The apparatus of claim 1 further comprising:
a spring carrier that contacts a protrusion of the head that extends in the lengthwise direction from the head; and
a spring contacting the spring carrier that drives the spring carrier towards the protrusion of the head.

5. The apparatus of claim 1 further comprising:
a stop that ensures that the slide does not travel further than a predefined distance away from the sleeve when the slide is moved to the open position.

6. The apparatus of claim 1 wherein:
the annular protrusion and the inner surface of the circumferential lip are made from metal.

7. The apparatus of claim 6 wherein:
the annular protrusion and the inner surface each have a roughness value (Ra) of less than five microinches.

8. The apparatus of claim 1 wherein:
the head defines flow grooves that provide flow paths between the first port and the second port when the slide is in the open position, wherein the circumferential lip extends perpendicularly to the lengthwise direction beyond the flow grooves.

9. The apparatus of claim 8 wherein:
the flow grooves are circumferentially distributed across the head.

10. The apparatus of claim 8 wherein:
the flow grooves protrude beyond the sleeve when the slide is in the open position; and
the flow grooves are disposed within the sleeve when the slide is in the closed position.

11. The apparatus of claim 8 wherein:
a depth of each flow groove increases from the head towards the shaft.

12. A method for operating a slide of a hydraulic valve, wherein the hydraulic valve includes a housing that defines a first port, a second port, a third port for a hydraulic fluid, and a sleeve disposed within the housing that defines openings in fluid communication with the second port and the third port, wherein the slide comprises a head at a first end and a shaft at a second end, and wherein the slide is disposed within the sleeve and is movable in a lengthwise direction from a closed position to an open position, the method comprising:

displacing the slide from the open position to the closed position such that an inner surface of a circumferential lip extending perpendicularly to the lengthwise direction of the head and facing the sleeve abuts an annular protrusion on an end face of the sleeve that protrudes in the lengthwise direction to form a seal between the slide and the sleeve to stop flow of the hydraulic fluid through the first port into the sleeve;

maintaining the slide in the closed position in response to pressure from the hydraulic fluid applied to the circumferential lip from outside of the sleeve; and displacing the slide from the closed position to the open position, thereby enabling the hydraulic fluid to flow across the head through the sleeve to the second port.

13. The method of claim 12 further comprising:
enabling flow of the hydraulic fluid from the second port across the slide and into the third port when the slide is in the closed position.

14. The method of claim 12 wherein:
displacing the slide from the open position to the closed position results in metal to metal contact between the inner surface of the circumferential lip and the annular protrusion of the sleeve.

15. The method of claim 12 wherein:
displacing the slide from the open position to the closed position comprises applying force to the head via a spring carrier contacting the head, wherein a spring contacting the spring carrier drives the spring carrier towards the head.

16. The method of claim 12 wherein:
displacing the slide from the closed position to the open position exposes flow grooves within the head that enable the hydraulic fluid to flow across the head.

17. The method of claim 12 further comprising:
preventing flow of the hydraulic fluid from the second port to the third port when the slide is in the open position.

18. An apparatus comprising:
a sleeve that includes an annular protrusion that protrudes from an end face of the sleeve in a lengthwise direction; and
a slide disposed within the sleeve and movable in the lengthwise direction, the slide comprising:
  a head disposed at a left end of the slide, comprising:
    a head protrusion forming a leftmost portion of the head;
    a circumferential lip that is disposed rightward of the head protrusion, and that includes an inner surface extending perpendicularly to a length of the slide and facing the sleeve, wherein the inner surface abuts the annular protrusion of the sleeve when the slide is in a closed position such that flow of a hydraulic fluid through an inlet port is stopped; and
    circumferentially disposed flow grooves which are located rightward of the circumferential lip and extend rightward; and
  a shaft disposed rightward of the head, comprising:
    a shaft body having a width less than a width of the sleeve; and
    a shaft base having a diameter corresponding with an inner diameter of the sleeve.

19. The apparatus of claim 18 wherein:
the circumferential lip extends perpendicularly to rightward, beyond the circumferentially disposed flow grooves.

20. The apparatus of claim 18 wherein:
a depth of each of the circumferentially disposed flow grooves increases from the head towards the shaft body.

* * * * *